United States Patent
Park et al.

(10) Patent No.: US 12,525,265 B2
(45) Date of Patent: Jan. 13, 2026

(54) MEMORY DEVICE FOR STORING PLURALITY OF DATA BITS AND METHOD OF OPERATING THE SAME

(71) Applicant: SK hynix Inc., Gyeonggi-do (KR)

(72) Inventors: Tae Hun Park, Gyeonggi-do (KR);
Kyu Nam Lim, Gyeonggi-do (KR);
Dong Hun Kwak, Gyeonggi-do (KR);
Hyung Jin Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 224 days.

(21) Appl. No.: 18/450,413

(22) Filed: Aug. 16, 2023

(65) Prior Publication Data
US 2024/0304225 A1  Sep. 12, 2024

(30) Foreign Application Priority Data
Mar. 7, 2023 (KR) .......................... 10-2023-0029945

(51) Int. Cl.
*G11C 7/10* (2006.01)
*G11C 11/56* (2006.01)

(52) U.S. Cl.
CPC .......... *G11C 7/1006* (2013.01); *G11C 7/1051* (2013.01); *G11C 7/1078* (2013.01); *G11C 11/56* (2013.01)

(58) Field of Classification Search
CPC .............................. G06F 7/405; G11C 7/1006
See application file for complete search history.

(56) References Cited

U.S. PATENT DOCUMENTS

2022/0012011 A1\* 1/2022 Wang ...................... G06F 7/405

FOREIGN PATENT DOCUMENTS

| KR | 10-2010-0083833 A | 7/2010 |
| KR | 10-2014-0142365 A | 12/2014 |
| KR | 10-2019-0134096 A | 12/2019 |

\* cited by examiner

*Primary Examiner* — Jason Lappas
(74) *Attorney, Agent, or Firm* — IP & T GROUP LLP

(57) ABSTRACT

The present technology relates to a semiconductor device. According to the present technology, a memory device capable of dividing and storing a plurality of data bits in a plurality of memory cells may include a plurality of memory cells each configured to have a state among a plurality of states, a code table generator configured to generate, based on a plurality of data bits, a code table indicating the plurality of states as code patterns formed by parts of the data bits, the parts corresponding to the respective memory cells, and an internal operation controller configured to divide and store a plurality of target data bits in the plurality of memory cells based on the code table during a program operation.

15 Claims, 14 Drawing Sheets

FIG. 4

|     |     | E | PV1 | PV2 | PV3 | PV4 | PV5 | X | X |
|-----|-----|---|-----|-----|-----|-----|-----|---|---|
|     | PSB | 1 | 0   | 0   | 1   | 1   | 1   | 0 | 0 |
| MC1 | QSB | 1 | 1   | 0   | 0   | 0   | 1   | 0 | 1 |
|     | CSB | 1 | 1   | 1   | 1   | 0   | 0   | 0 | 0 |
|     | CSB | 1 | 1   | 1   | 1   | 0   | 0   | 0 | 0 |
| MC2 | MSB | 1 | 1   | 0   | 0   | 0   | 1   | 0 | 1 |
|     | LSB | 1 | 0   | 0   | 1   | 1   | 1   | 0 | 0 |

FIG. 6

|     | data read | decoding read | count |
|-----|-----------|---------------|-------|
| PSB | 2         | 2 (CSB)       | 4     |
| QSB | 2         | X             | 2     |
| CSB | 2         | X             | 2     |
| MSB | 2         | X             | 2     |
| LSB | 2         | 2 (CSB)       | 4     |

FIG. 8

| MC1 \ MC2 | E | PV1 | PV2 | PV3 | PV4 | PV5 |
|---|---|---|---|---|---|---|
| E | 1,1,1,1 | 0,1,1,1 | 0,0,1,1 | 1,0,1,1 | 0,0,0,1 | 0,1,0,1 |
| PV1 | 1,1,1,0 | 0,1,1,0 | 0,0,1,0 | 1,0,1,0 | 0,0,0,0 | 0,1,0,0 |
| PV2 | 1,1,0,0 | 0,1,0,0 | 0,0,0,0 | 1,0,0,0 | 0,0,0,0 | 0,1,0,0 |
| PV3 | 1,1,0,1 | 0,1,0,1 | 0,0,1,0 | 1,0,1,0 | 0,0,0,1 | 0,1,0,1 |
| PV4 | X | 1,1,0,0 | 1,0,0,0 | X | 1,0,0,1 | 1,1,0,1 |
| PV5 | X | 1,1,0,1 | 1,0,0,1 | X | 1,0,1,1 | 1,1,0,1 |

|  |  | E | PV1 | PV2 | PV3 | PV4 | PV5 | X | X |
|---|---|---|---|---|---|---|---|---|---|
|  | EMB | 1 | 1 | 1 | 1 | 0 | 0 | 0 | 0 |
| MC1 | PSB | 1 | 0 | 0 | 1 | 1 | 0 | 0 | 1 |
|  | QSB | 1 | 1 | 0 | 0 | 0 | 0 | 1 | 1 |
|  | MSB | 1 | 1 | 1 | 1 | 0 | 0 | 0 | 0 |
| MC2 | CSB | 1 | 0 | 0 | 1 | 1 | 0 | 0 | 1 |
|  | LSB | 1 | 1 | 0 | 0 | 0 | 0 | 1 | 1 |

FIG. 12

|     | data read | decoding read | count |
|-----|-----------|---------------|-------|
| PSB | 3         | X             | 3     |
| QSB | 1         | 2 (EMB, LSB)  | 3     |
| MSB | 1         | 1 (EMB)       | 2     |
| CSB | 3         | X             | 3     |
| LSB | 1         | 1 (EMB)       | 2     |

MEMORY DEVICE FOR STORING PLURALITY OF DATA BITS AND METHOD OF OPERATING THE SAME

CROSS-REFERENCE TO RELATED APPLICATION

The present application claims priority under 35 U.S.C. § 119(a) to Korean patent application number 10-2023-0029945 filed on Mar. 7, 2023, the entire disclosure of which is incorporated by reference herein.

BACKGROUND

1. Field of Invention

Embodiments of the present disclosure relate to a semiconductor device, and more particularly, to a program operation and a read operation of a memory device.

2. Description of Related Art

Memory devices may be devices for storing data, and may be classified into volatile memory devices and nonvolatile memory devices.

A memory device may include a plurality of memory cells storing a plurality of data bits. As the number of data bits stored in the memory cell increases, the number of states of the memory cells may also increase. Conversely, as the number of data bits stored in the memory cell decreases, efficiency of the memory cells may decrease.

SUMMARY

Embodiments of the present disclosure provide a memory device and a method of operating the same, capable of dividing and storing a plurality of data bits in a plurality of memory cells.

According to an embodiment of the present disclosure, a memory device may include a plurality of memory cells each configured to have a stage among a plurality of states, a code table generator configured to generate, based on a plurality of data bits, a code table indicating the plurality of states as code patterns formed by parts of the data bits, the parts corresponding to the respective memory cells, and an internal operation controller configured to divide and store a plurality of target data bits in the plurality of memory cells based on the code table during a program operation.

According to an embodiment of the present disclosure, a method of operating a memory device may include dividing, during a program operation, a plurality of target data bits into one or more first data bits, one or more second data bits, and a common data bit indicating whether the first data bits and the second data bits are encoded, storing the common data bit and the first data bits in a first memory cell, and storing the common data bit and the second data bits in a second memory cell.

According to an embodiment of the present disclosure, a method of operating a memory device may include dividing, during a program operation, a plurality of target data bits into one or more first data bits and a plurality of second data bits, generating an additional data bit indicating whether the first data bits and the plurality of second data bits are encoded, storing the additional data bit and the first data bits in a first memory cell, and storing the plurality of second data bits in a second memory cell.

According to an embodiment of the present disclosure, a method of operating a memory device may include combining OD number of data bits and a single extra bit to generate ED number of target bits, OD being odd and the extra bit being a copy of a selected one among the data bits, dividing the target bits into first and second groups each configured by HED number of bits, the extra bit belonging to the first group and the selected bit belonging to the second group, performing, when any of the first and second groups has one of one or more prohibited bit patterns, a first inverting operation of inverting a predetermined bit within each of the first and second groups and inverting the extra bit, the predetermined bit being other than the extra bit and the selected bit, performing, when any of the first and second groups has one of the prohibited bit patterns as a result of the first inverting operation, a second inverting operation of inverting the extra bit and the selected bit and programming the first and second groups respectively into first and second memory cells, wherein a number of the prohibited bit patterns is defined as $2^{HED}-P$, P being a minimum natural number satisfying $P^2 > 2^{OD}$ and representing a number of non-prohibited bit patterns configuring, together with the prohibited bit patterns, $2^{HED}$ number of bit patterns, and wherein the prohibited bit patterns respectively correspond to highest ones among program states possible from the $2^{HED}$ number of bit patterns.

BRIEF DESCRIPTION OF THE DRAWINGS

FIG. 4 is a diagram illustrating an example of a code table according to an embodiment of the present disclosure.

FIG. 6 is a diagram illustrating an example of the number of reads required for a read operation according to an embodiment of the present disclosure.

FIG. 8 is a diagram illustrating a mapping relationship between data patterns and a plurality of states according to an embodiment of the present disclosure.

FIG. 12 is a diagram illustrating another example of the number of reads required for a read operation according to an embodiment of the present disclosure.

DETAILED DESCRIPTION

Specific structural or functional descriptions of embodiments according to the concepts which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
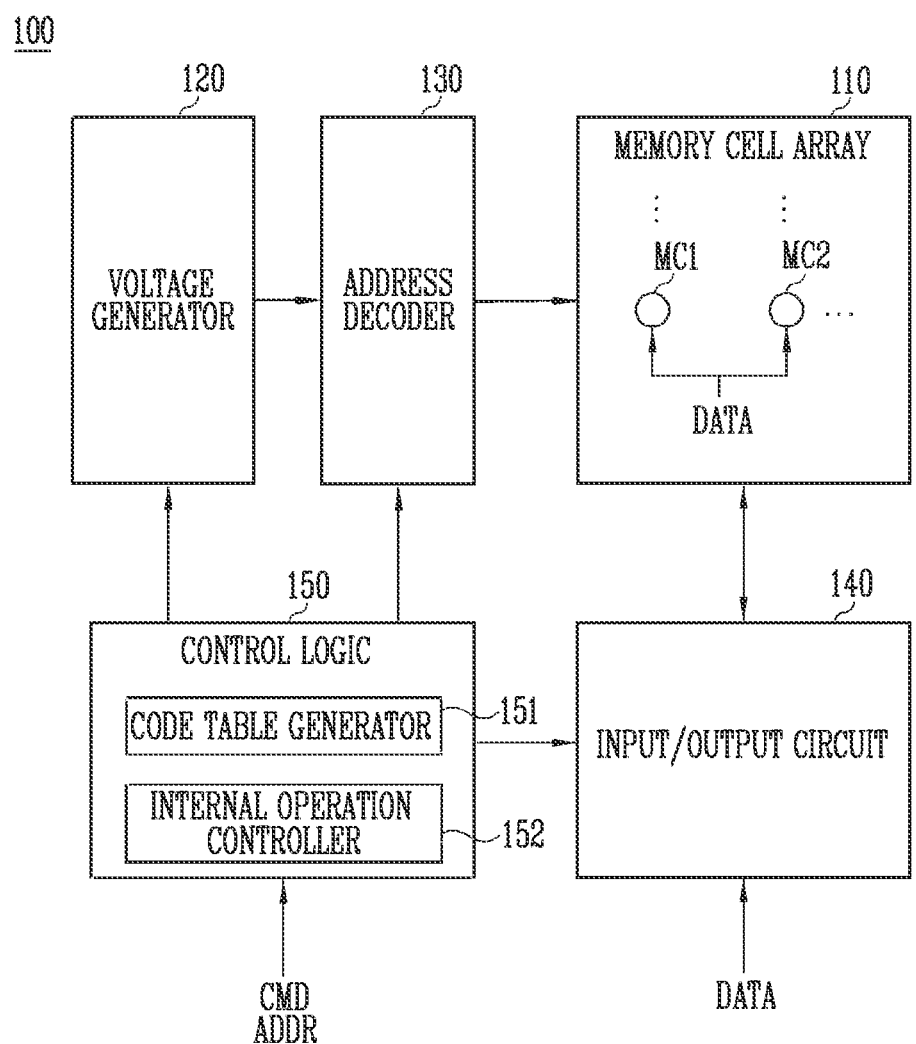
FIG. 1 is a diagram illustrating a memory device according to an embodiment of the present disclosure.

FIG. 1 is a diagram illustrating a memory device 100 according to an embodiment of the present disclosure.

Referring to FIG. 1, the memory device 100 may include a memory cell array 110, a voltage generator 120, an address decoder 130, an input/output circuit 140, and a control logic 150.

The memory cell array 110 may be connected to the address decoder 130 through row lines. The memory cell array 110 may be connected to the input/output circuit 140 through column lines. In an embodiment, the row lines may include word lines, source select lines, and drain select lines. In an embodiment, the column lines may include bit lines.

The memory cell array 110 may include a plurality of memory cells MC1, MC2, . . . storing data DATA. At this time, the data DATA may include a plurality of data bits.

Each of the memory cells MC1, MC2, . . . may be configured as a cell capable of storing the plurality of data bits such as a multi-level cell (MLC), a triple level cell (TLC), and a quad level cell (QLC). Among the plurality of memory cells MC1, MC2, . . . , memory cells connected to the same word line may be defined as one physical page.

In an embodiment, the memory cells MC1, MC2, . . . may divide and store the plurality of data bits. In FIG. 1, a first memory cell MC1 and a second memory cell MC2 divide and store the plurality of data bits, but the present disclosure is not necessarily limited thereto. The number of memory cells dividing and storing data bits may vary according to an embodiment.

In an embodiment, each of the memory cells MC1, MC2, . . . may have a state among a plurality of states.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell arrays 110 to perform a write operation, a read operation, and an erase operation.

The voltage generator 120 may be configured to generate various voltages required by the memory device 100 using an external power voltage or an internal power voltage. For example, the voltage generator 120 may generate a plurality of erase voltages, a plurality of program voltages, a plurality of pass voltages, a plurality of read voltages, and the like. The generated voltages may be supplied to the memory cell array 110 by the address decoder 130.

The address decoder 130 may receive an address ADDR from the control logic 150. The address decoder 130 may decode a row address among the received addresses ADDR. The address decoder 130 may select at least one word line among word lines of the memory cell array according to a decoded row address. In an embodiment, the address decoder 130 may decode a column address among the received addresses ADDR. The address decoder 130 may connect the input/output circuit 140 and the memory cell array 110 according to a decoded column address.

The address decoder 130 may include components such as a row decoder, a column decoder, and an address buffer.

The input/output circuit 140 may include a plurality of page buffers. The plurality of page buffers may be connected to the memory cell array 110 through the bit lines. During a program operation, the data DATA may be stored in the memory cells selected according to the data DATA stored in the plurality of page buffers.

During the read operation, the data stored in the selected memory cells may be sensed through the bit lines, and the sensed data may be stored in the page buffers.

The control logic 150 may control the voltage generator 120, the address decoder 130, and the input/output circuit 140. The control logic 150 may operate in response to a command CMD transferred from an external device. The control logic 150 may control the peripheral circuits by generating various signals in response to the command CMD and the address ADDR.

In an embodiment, the control logic 150 may include a code table generator 151 and an internal operation controller 152.

The code table generator 151 may generate a code table based on the plurality of data bits. In an embodiment, the code table may indicate the plurality of states as code patterns formed by data bits corresponding to each of the plurality of memory cells MC1, MC2, . . . . That is, the code table may be information through which data patterns formed by the plurality of data bits are mapped to code pattern combinations between the plurality of states. A method of generating the code table is described in detail with reference to FIGS. 4 and 10 to be described later.

During the program operation, the internal operation controller 152 may divide and store a plurality of target data bits in the plurality of memory cells MC1, MC2, . . . , based on the code table.

In an embodiment, the internal operation controller 152 may generate data bits to be stored in each of the plurality of memory cells MC1, MC2, . . . by encoding the plurality of target data bits based on the code table. The internal operation controller 152 may store each of the generated data bits in the plurality of memory cells MC1, MC2, . . . .

In an embodiment, during the read operation, the internal operation controller 152 may read the data bits divided and stored in the plurality of memory cells MC1, MC2, . . . , and obtain read data by decoding the read data bits based on the code table. The obtained read data may be transferred to an external device through the input/output circuit 140.

Figure 2:
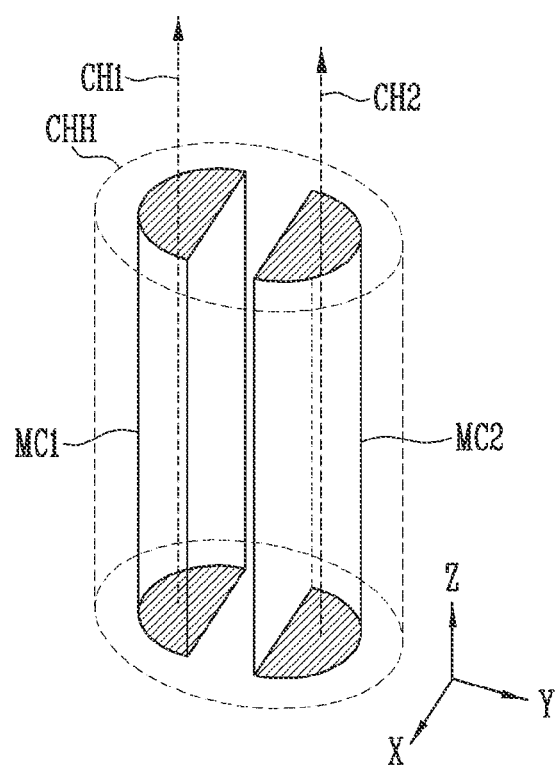
FIG. 2 is a diagram illustrating a structure of memory cells according to an embodiment of the present disclosure.

FIG. 2 is a diagram illustrating a structure of memory cells according to an embodiment of the present disclosure.

In FIG. 2, for convenience of description, a structure in which a channel hole CHH is divided into two channel regions is described, but the present disclosure is not necessarily limited thereto. According to embodiments, the channel hole may be divided into three or more channel regions.

Referring to FIG. 2, one channel hole CHH may be divided into a first channel region CH1 and a second channel region CH2 through a cutting structure. Here, the channel region may mean a channel region of a memory cell string. At this time, the memory cell string may include at least one source select transistor, the plurality of memory cells MC1 and MC2, and at least one drain select transistor connected in series between a source line and the bit lines.

First memory cells MC1 may be connected to the first channel region CH1, and second memory cells MC2 may be connected to the second channel region CH2. Accordingly, a plurality of memory cells may be formed in one layer.

Figure 3:
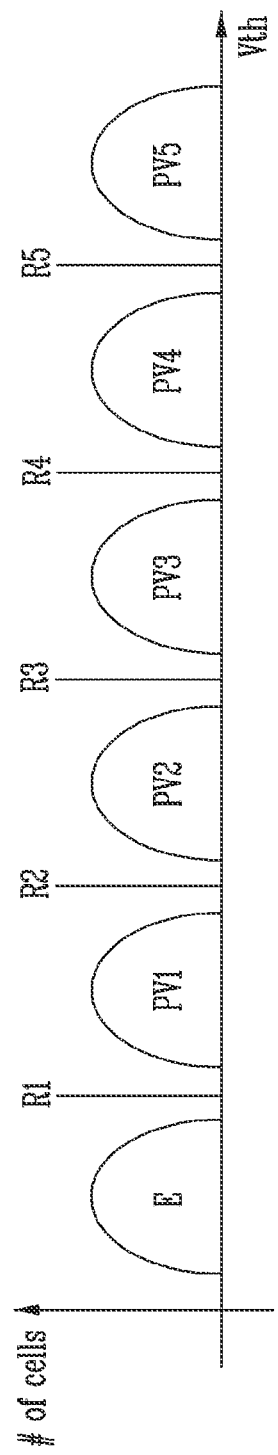
FIG. 3 is a diagram illustrating a plurality of states according to an embodiment of the present disclosure.

FIG. 3 is a diagram illustrating a plurality of states according to an embodiment of the present disclosure.

In an embodiment of the present disclosure, states of memory cells configured as a TLC are described.

Referring to FIG. 3, a horizontal axis represents a threshold voltage of a memory cell, and a vertical axis represents the number of memory cells.

Selected memory cells, which are memory cells connected to a selected word line, may have a threshold voltage distribution corresponding to an erase state E before the program operation is performed.

In an embodiment, a plurality of states E and PV1 to PV5 may have a number less than a maximum number of a code pattern that may be formed by data bits corresponding to each of the plurality of memory cells. For example, when the memory cell may store three data bits, the maximum number of the code pattern that may be formed by the data bits may be eight. At this time, the plurality of states may be configured as six states which is less than eight. Specifically, the memory cell may be programmed to have a threshold voltage corresponding to one of the erase state E, a first program state PV1, a second program state PV2, a third program state PV3, a fourth program state PV4, and a fifth program state PV5.

The memory device 100 may read data stored in the selected memory cells by performing a read operation using first to fifth read voltages R1 to R5.

The first read voltage R1 may be a read voltage for distinguishing the erase state E and the first program state PV1, the second read voltage R2 may be a read voltage for distinguishing the first program state PV1 and the second program state PV2, the third read voltage R3 may be a read voltage for distinguishing the second program state PV2 and the third program state PV3, the fourth read voltage R4 may be a read voltage for distinguishing the third program state PV3 and the fourth program state PV4, and the fifth read voltage R5 may be a read voltage for distinguishing the fourth program state PV4 and the fifth program state PV5.

FIG. 4 is a diagram illustrating an example of a code table according to an embodiment of the present disclosure. In the present disclosure, for convenience of description, embodiments in which two memory cells MC1 and MC2 divide and store five data bits are described. However, this is only an example, and the number of memory cells and the number of data bits may be set variously according to an embodiment.

Referring to FIG. 4, the five data bits may include a least significant bit (LSB), a most significant bit (MSB), a central significant bit (CSB), a quad significant bit (QSB), and a penta significant bit (PSB).

The code table may include a code table for each of the plurality of memory cells MC1 and MC2.

In an embodiment, the code table generator 151 may divide the plurality of data bits into one or more first data bits, one or more second data bits, and a common data bit. At this time, the common data bit may indicate whether the first data bits and the second data bits are encoded.

For example, the common data bit may be the CSB, the one or more first data bits may be the QSB and the PSB, and the one or more second data bits may be the LSB and the MSB.

In an embodiment, the code table generator 151 may allocate the common data bit and the one or more first data bits to the code table of the first memory cell MC1.

For example, the code table generator 151 may allocate the PSB, the QSB, and the CSB to the code table of the first memory cell MC1. That is, the first memory cell MC1 may store the PSB, the QSB, and the CSB. In this case, the code table of the first memory cell MC1 may be information indicating the plurality of states E, PV1 to PV5 as code patterns formed by the PSB, the QSB, and the CSB. When displaying in an order of the PSB, the QSB, and the CSB, in the first memory cell MC1, the code pattern of the erase state E may be "1, 1, 1", the code pattern of the first program state PV1 may be "0, 1, 1", the code pattern of the second program state PV2 may be "0, 0, 1", the code pattern of the third program state PV3 may be "1, 0, 1", the code pattern of the fourth program state PV4 may be "1, 0, 0", and the code pattern of the fifth program state PV5 may be "1, 1, 0".

In an embodiment, the code table generator 151 may allocate the common data bit and the one or more second data bits to the code table of the second memory cell MC2.

For example, the code table generator 151 may allocate the CSB, the LSB, and the MSB to the code table of the second memory cell MC2. That is, the second memory cell MC2 may store the CSB, the LSB, and the MSB. In this case, the code table of the second memory cell MC2 may be information indicating the plurality of states E and PV1 to PV5 as code patterns formed by the CSB, the LSB, and the MSB. When displaying in an order of the CSB, the MSB, and the LSB, in the second memory cell MC2, the code pattern of the erase state E may be "1, 1, 1", the code pattern of the first program state PV1 may be "1, 1, 0", the code pattern of the second program state PV2 may be "1, 0, 0", the code pattern of the third program state PV3 may be "1, 0, 1", the code pattern of the fourth program state PV4 may be "0, 0, 1", and the code pattern of the fifth program state PV5 may be "0, 1, 1".

Therefore, data patterns formed by the PSB, the QSB, the CSB, the MSB, and the LSB may be mapped to code pattern combinations between states of each of the first memory cell MC1 and the second memory cell MC2 according to the code table.

Since the first memory cell and the second memory cell do not have a threshold voltage higher than the fifth program state PV5, a portion of the code patterns that may be formed by the plurality of data bits may correspond to an invalid code pattern. For example, "0, 0, 0" and "0, 1, 0" which are code patterns which may be formed by the PSB, the QSB, and the CSB and "0, 0, 0" and "0, 1, 0" which may be formed by the CSB, the MSB, and the LSB" may be invalid code patterns. In this case, the code table generator 151 may set the corresponding code patterns as preset code patterns and encode the corresponding code patterns into valid code patterns. An operation of generating a code table by encoding corresponding code patterns is described in detail with reference to FIG. 5 to be described later.

Figure 5:
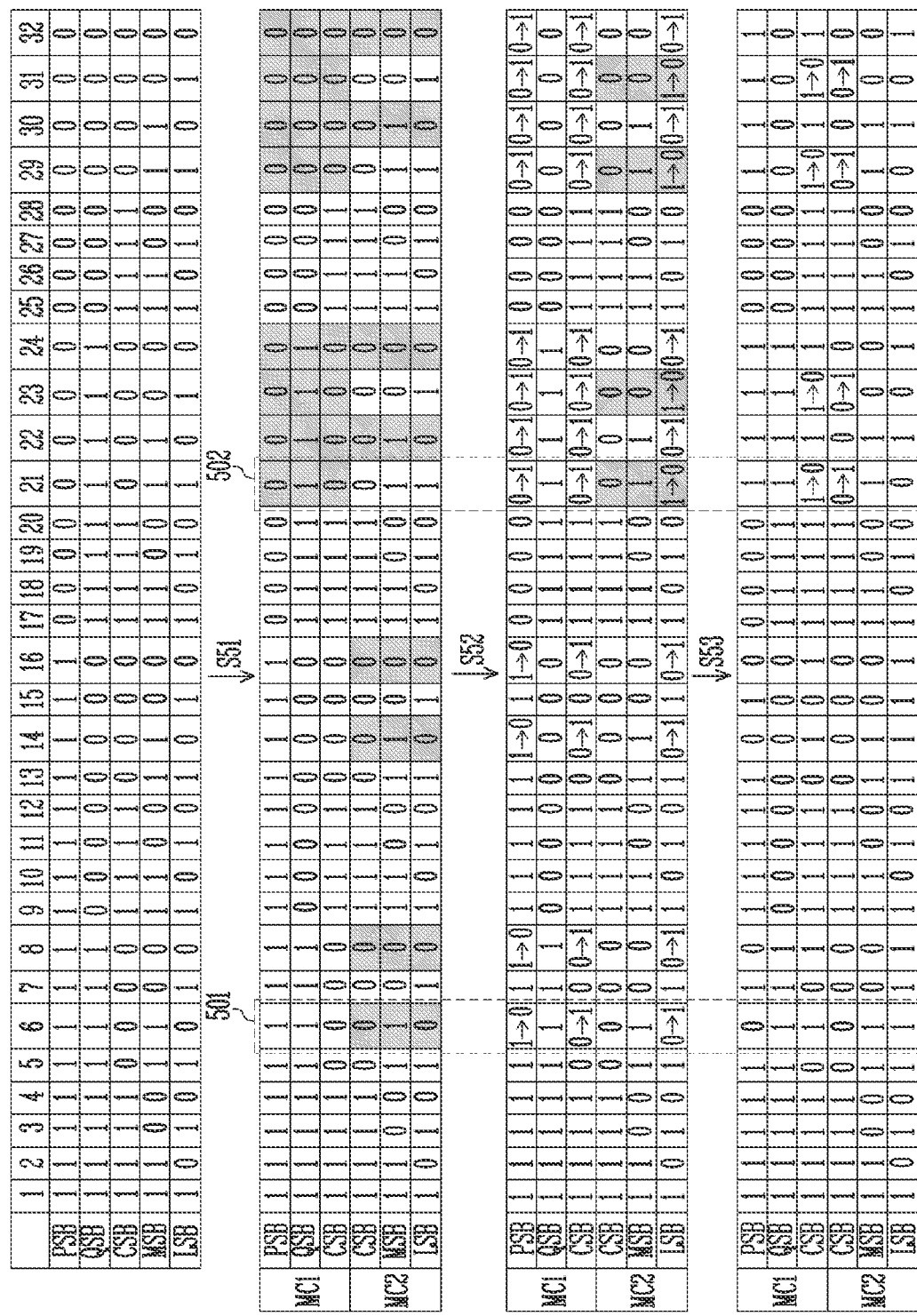
FIG. 5 is a diagram illustrating an example of encoding a plurality of data bits according to an embodiment of the present disclosure.

FIG. 5 is a diagram illustrating an example of encoding a plurality of data bits according to an embodiment of the present disclosure.

Referring to FIG. 5, a table shown at an uppermost end may indicate the data patterns formed by the PSB, the QSB, the CSB, the MSB, and the LSB. A total of 32 data patterns formed by the PSB, the QSB, the CSB, the MSB, and the LSB may exist. The data patterns shown in FIG. 5 are merely examples, and are not necessarily limited thereto. According to an embodiment, an order in which the PSB, the QSB, the CSB, the MSB, and the LSB are listed and a value of each of the data bits according to the order may be variously set.

In operation S51, the code table generator 151 may copy the CSB which is the common data bit and allocates the CSB to the code table of the first memory cell MC1 and the second memory cell MC2. At this time, the code pattern formed by the common data bit and the one or more first data bits may correspond to the preset code pattern. Alternatively, the code pattern formed by the common data bit and the one or more second data bits may correspond to the preset code pattern. The preset code pattern may mean an invalid pattern.

For example, the invalid code pattern may be included in code patterns corresponding to a sixth data pattern, an eighth data pattern, a fourteenth data pattern, a sixteenth data pattern, twenty-first to twenty-fourth data patterns, and twenty-ninth to thirty-second data patterns.

Specifically, looking at code patterns 501 corresponding to the sixth data pattern, the code pattern formed by the CSB, the MSB, and the LSB corresponding to the second memory cell MC2 may be the invalid code pattern. In addition, looking at code patterns 502 corresponding to the twenty-first data pattern, the code pattern formed by the PSB, the QSB, and the CSB corresponding to the first memory cell MC1 may be the invalid code pattern. Hereinafter, an operation of encoding the code patterns corresponding to the sixth data pattern and the twenty-first data pattern is described for convenience of description, and may be equally applied to other invalid code patterns.

In operation S52, the code table generator 151 may perform an encoding operation of inverting a first data bit among the one or more first data bits, and inverting a second data bit among the one or more second data bits.

For example, looking at the code patterns 501 corresponding to the sixth data pattern, the code table generator 151 may invert the PSB corresponding to the first memory cell MC1. Accordingly, a logical value of the PSB may be inverted from '1' to '0'. At this time, a first logical value may refer to '0' and a second logical value may refer to '1'. In addition, the code table generator 151 may invert the LSB corresponding to the second memory cell MC2. Accordingly, a logical value of the LSB may be inverted from '0' to '1'. Meanwhile, values of the QSB and the MSB which are not inverted may be maintained.

As another example, looking at the code patterns 502 corresponding to the twenty-first data pattern, the code table generator 151 may invert the PSB corresponding to the first memory cell MC1. Accordingly, the logical value of the PSB may be inverted from '0' to '1'. In addition, the code table generator 151 may invert the LSB corresponding to the second memory cell MC2. Accordingly, the logical value of the LSB may be inverted from '1' to '0'. Meanwhile, the values of the QSB and the MSB which are not inverted may be maintained.

In addition, the code table generator 151 may invert any of the common data bits to be stored in the first memory cell MC1 and the second memory cell MC2 so that the common data bits have different values from each other.

For example, looking at the code patterns 501 corresponding to the sixth data pattern, the code table generator 151 may invert the CSB corresponding to the first memory cell MC1. Accordingly, a logical value of the CSB may be inverted from '0' to '1'. In this case, the CSB to be stored in the first memory cell MC1 and the CSB to be stored in the second memory cell MC2 may have different values.

As another example, looking at the code patterns 502 corresponding to the twenty-first data pattern, the code table generator 151 may invert the CSB corresponding to the first memory cell MC1. Accordingly, the logical value of the CSB may be inverted from '0' to '1'. In this case, the CSB to be stored in the first memory cell MC1 and the CSB to be stored in the second memory cell MC2 may have different values.

Moreover, new invalid code patterns may occur after performing the above-described encoding operation. For example, the invalid code patterns may occur in the code patterns corresponding to the twenty-first data pattern, the twenty-third data pattern, the twenty-ninth data pattern, and the thirty-first data pattern.

In operation S53, the code table generator 151 may perform a re-encoding operation of inverting the common data bit to be stored in each of the first memory cell MC1 and the second memory cell MC2.

For example, looking at the code patterns 502 corresponding to the twenty-first data pattern, the code table generator 151 may invert the CSB corresponding to the first memory cell MC1 and the CSB corresponding to the second memory cell MC2. Accordingly, the logical value of the CSB corresponding to the first memory cell MC1 may be inverted from '1' to '0', and the logical value of the CSB corresponding to the second memory cell MC2 may be inverted from '0' to '1'.

As described above, when the common data bit to be stored in the first memory cell MC1 and the common data bit to be stored in the second memory cell MC2 have different values, information that the corresponding code patterns are inverted may be indicated.

Accordingly, the code table may include information in which a data pattern of a plurality of data bits is mapped to a combination of valid code patterns.

Figure 7:
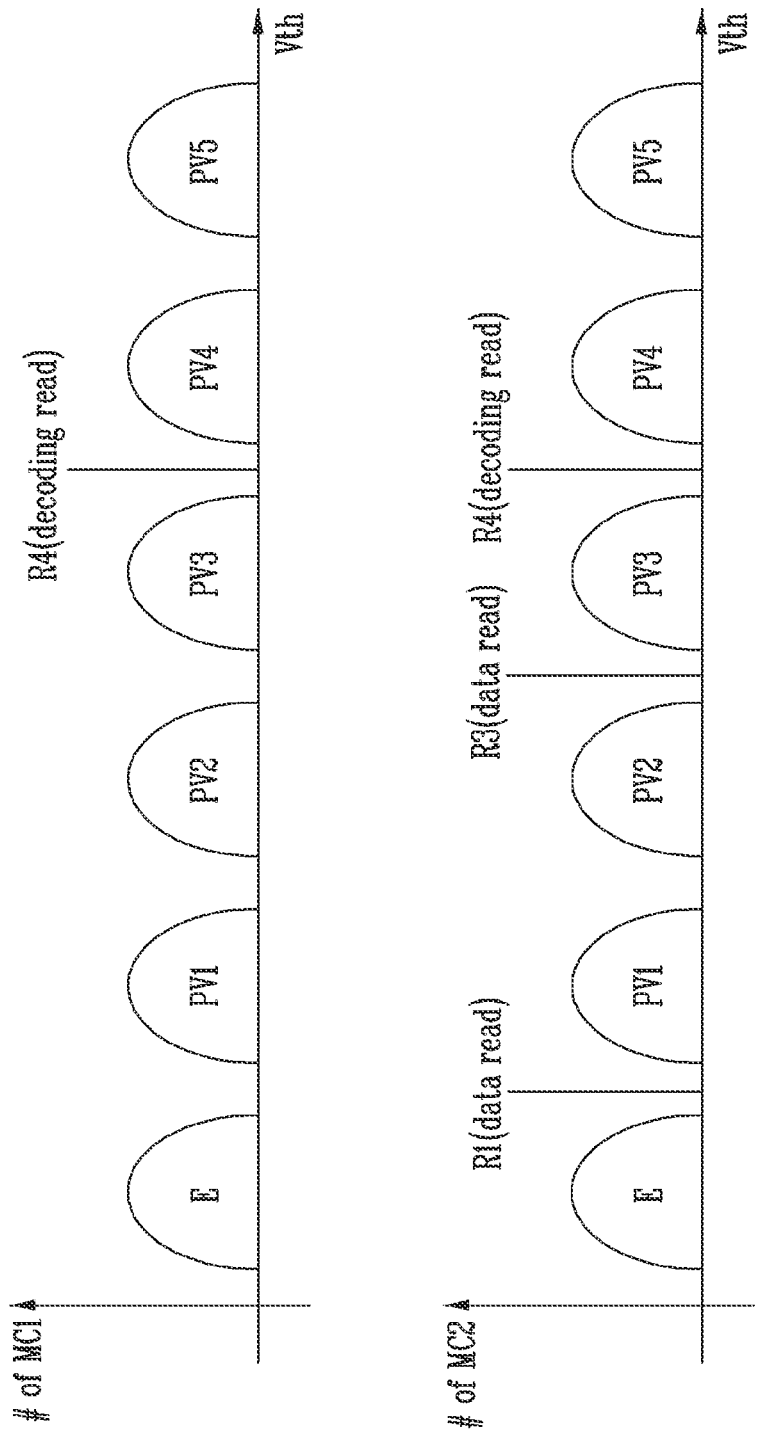
FIG. 7 is a diagram illustrating an example of a read operation according to an embodiment of the present disclosure.

FIG. 6 is a diagram illustrating an example of the number of reads required for a read operation according to an embodiment of the present disclosure. FIG. 7 is a diagram illustrating an example of a read operation according to an embodiment of the present disclosure. Specifically, FIG. 7 may illustrate the read operation of the LSB. In FIG. 7, a horizontal axis represents a threshold voltage of each memory cell, and a vertical axis represents the number of memory cells.

Referring to FIG. 6, a data read operation (data read) may be required at least twice to read each of the data bits. The data read operation (data read) may be a general read operation and may be a read operation for distinguishing a threshold voltage corresponding to a target data bit.

For example, the QSB and the MSB which are not encoded may be read from memory cells through two data read operations (data read).

When the CSBs sensed from the plurality of memory cells have the same value, the internal operation controller 152 may determine the corresponding value as a read value of the CSB. In contrast, when the sensed CSBs have different values, the internal operation controller 152 may determine the first logical value as the read value of the CSB. Therefore, the CSB may be read from the memory cells through two data read operations (data read).

In a case of the encoded PSB and LSB, a decoding read operation (decoding read) may be additionally performed in addition to the data read operation (data read). The decoding read operation (decoding read) may be an operation of reading the common data bit from each memory cell.

Referring to FIG. 7, a data read operation (data read) using a first read voltage R1 and a third read voltage R3 may be performed to read the LSB. In addition, since the CSB is required to be read from the plurality of memory cells MC1 and MC2 in order to determine whether a read data bit has an inverted value through the encoding operation in the previous program operation, two decoding read operations (decoding read) may be performed.

In an embodiment, the internal operation controller 152 may perform a decoding operation of inverting, based on the common data bit, an encoded data bit (i.e., a read data bit having an inverted value through the encoding operation in the previous program operation) among the one or more first data bits and the one or more second data bits. For example, when it is determined, through a result of the decoding read operation (decoding read), that the LSB is inverted by the encoding operation in the previous program operation, the internal operation controller 152 may perform a decoding operation of inverting the LSB sensed through the data read operation (data read). In contrast, when it is determined, through a result of the decoding read operation (decoding read), that the LSB is not encoded (i.e., the LSB is determined as having a non-inverted value through the encoding operation in the previous program operation), the internal operation controller 152 may determine a value sensed through the data read operation (data read) as a read value of the LSB.

FIG. 8 is a diagram illustrating a mapping relationship between data patterns and a plurality of states according to an embodiment of the present disclosure. In FIG. 8, the code pattern may be indicated in an order of the LSB, the MSB, the CSB, the QSB, and the PSB.

Referring to FIG. 8, 32 data patterns formed by the LSB, the MSB, the CSB, the QSB, and the PSB are mapped to code pattern combinations between the states E and PV1 to PV5 of each of the memory cells MC1 and MC2. Accordingly, the memory device 100 may store five data bits (LSB, MSB, CSB, QSB, and PSB) in the two memory cells MC1 and MC2 based on the code table.

Furthermore, a portion of the code pattern combinations may not be mapped to the data patterns. For example, a combination of the code pattern indicating the fourth program state PV4 of the first memory cell MC1 and the code pattern indicating the erase state E of the second memory cell MC2 may not be mapped to the data patterns. In addition, a combination of the code pattern indicating the fourth program state PV4 of the first memory cell MC1 and the code pattern indicating the third program state PV3 of the second memory cell MC2 may not be mapped to the data patterns. In addition, a combination of the code pattern indicating the fifth program state PV5 of the first memory cell MC1 and the code pattern indicating the erase state E of the second memory cell MC2 may not be mapped to the data patterns. In addition, a combination of the code pattern indicating the fifth program state PV5 of the first memory cell MC1 and the code pattern indicating the third program state PV3 of the second memory cell MC2 may not be mapped to the data patterns. That is, when the first memory cell MC1 has the fourth program state PV4 or the fifth program state PV5, the second memory cell MC2 may not have the erase state E or the third program state PV3.

Figures 9, 10:
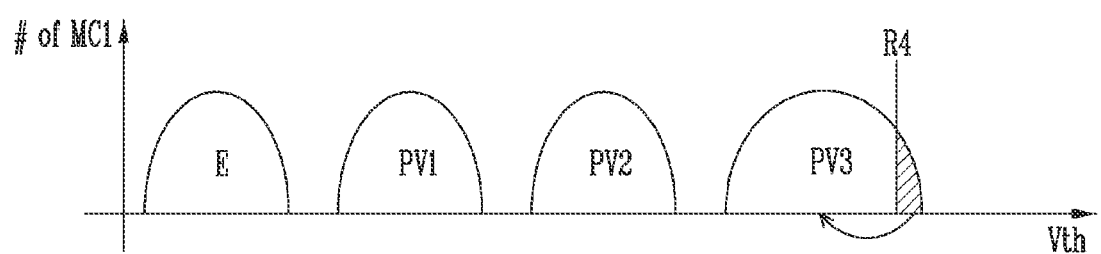
FIG. 9 is a diagram illustrating an example of correcting a read result according to an embodiment of the present disclosure.
FIG. 10 is a diagram illustrating another example of a code table according to an embodiment of the present disclosure.

FIG. 9 is a diagram illustrating an example of correcting a read result according to an embodiment of the present disclosure. In FIG. 9, a horizontal axis represents a threshold voltage of the first memory cell MC1, and a vertical axis represents the number of memory cells.

As described with reference to FIG. 8, when the second memory cell MC2 has the erase state E or the third program state PV3, the first memory cell MC1 may not have the fourth program state PV4 or the fifth program state PV5. In this case, when the second memory cell MC2 is sensed as the erase state E or the third program state PV3 during the read operation, the internal operation controller 152 may correct a read result so that the first memory cell MC1 is sensed as another state other than the fourth program state PV4 and the fifth program state PV5. For example, when the read operation is performed using a fourth read voltage R4 and the first memory cell MC1 has a threshold voltage higher than the fourth read voltage R4, the read result may be corrected so that the first memory cell MC1 is sensed as the third program state PV3.

FIG. 10 is a diagram illustrating another example of a code table according to an embodiment of the present disclosure.

The code table shown in FIG. 10 may be generated in a method different from that of the code table shown in FIG. 4.

In an embodiment, the code table generator 151 may divide the plurality of data bits into one or more first data bits and a plurality of second data bits. For example, the one or more first data bits may be the PSB and the QSB. In addition, the plurality of second data bits may be the LSB, the CSB, and the MSB.

In an embodiment, the code table generator 151 may generate an additional data bit indicating whether the first data bits and the plurality of second data bits are encoded. The additional data bit may be an encoding management bit (EMB).

In an embodiment, the code table generator 151 may allocate the additional data bit and the one or more first data bits to the code table of the first memory cell.

For example, the code table generator 151 may allocate the EMB, the PSB, and the QSB to the code table of the first memory cell MC1. That is, the first memory cell MC1 may store the EMB, the PSB, and the QSB. In this case, the code table of the first memory cell MC1 may be information indicating the plurality of states E and PV1 to PV5 as code patterns formed by the EMB, the PSB, and the QSB. When displaying in an order of the EMB, the PSB, and the QSB, in the first memory cell MC1, the code pattern of the erase state E may be "1, 1, 1", the code pattern of the first program state PV1 may be "1, 0, 1", the code pattern of the second program state PV2 may be "1, 0, 0", the code pattern of the third program state PV3 may be "1, 1, 0", the code pattern of the fourth program state PV4 may be "0, 1, 0", and the code pattern of the fifth program state PV5 may be "0, 0, 0".

In an embodiment, the code table generator 151 may allocate the plurality of second data bits to the code table of the second memory cell.

For example, the code table generator 151 may allocate the MSB, the CSB, and the LSB to the code table of the second memory cell MC2. That is, the second memory cell MC2 may store the MSB, the CSB, and the LSB. In this case, the code table of the second memory cell MC2 may be information indicating the plurality of states E and PV1 to PV5 as code patterns formed by the MSB, the CSB, and the LSB. When displaying in an order of the MSB, the CSB, and the LSB, in the second memory cell MC2, the code pattern of the erase state E may be "1, 1, 1", the code pattern of the first program state PV1 may be "1, 0, 1", the code pattern of the second program state PV2 may be "1, 0, 0", the code pattern of the third program state PV3 may be "1, 1, 0", the code pattern of the fourth program state PV4 may be "0, 1, 0", and the code pattern of the fifth program state PV5 may be "0, 0, 0".

Therefore, the data patterns formed by the PSB, the QSB, the MSB, the CSB, and the LSB may be mapped to the code pattern combinations between the states of each of the first memory cell MC1 and the second memory cell MC2 according to the code table.

Moreover, since the first memory cell and the second memory cell do not have a threshold voltage higher than the fifth program state PV5, a portion of the code patterns that may be formed by the plurality of data bits may correspond to invalid code patterns. For example, "0, 0, 1" and "0, 1, 1" which are code patterns that may be formed by the EMB, the PSB, and the QSB and "0, 0, 1" and "0, 1, 1" which are code patterns that may be formed by the MSB, the CSB, and the LSB" may be the invalid code patterns. In this case, the code table generator 151 may set corresponding code patterns as preset code patterns and encode the corresponding code patterns to the valid code patterns. An operation of generating a code table by encoding the corresponding code patterns is described in detail with reference to FIG. 11 to be described later.

Figure 11:
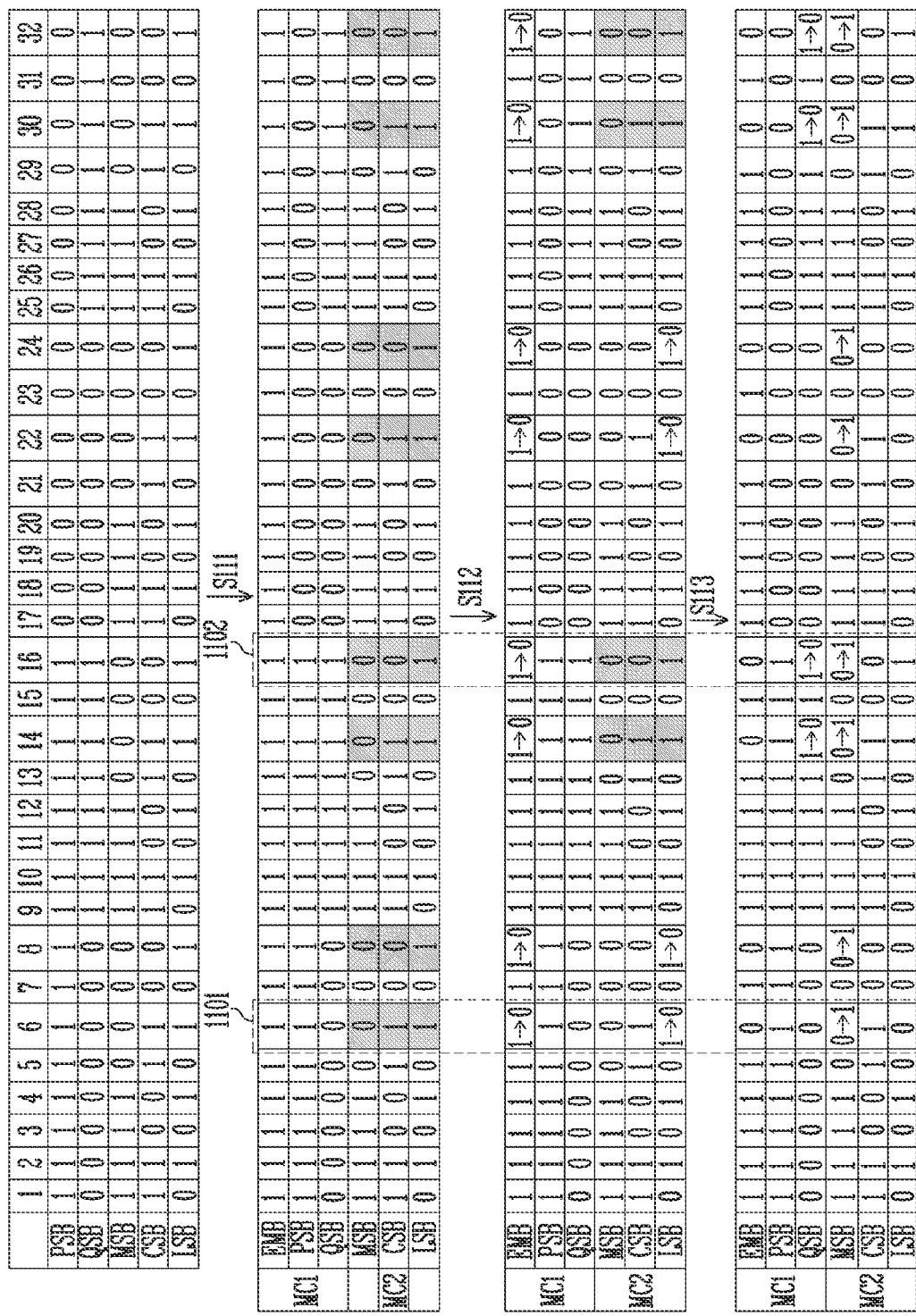
FIG. 11 is a diagram illustrating another example of encoding a plurality of data bits according to an embodiment of the present disclosure.

FIG. 11 is a diagram illustrating another example of encoding a plurality of data bits according to an embodiment of the present disclosure.

Referring to FIG. 11, a table shown at an uppermost end may indicate the data patterns formed by the PSB, the QSB, the MSB, the CSB, and the LSB. FIG. 11 may illustrate a table having data patterns different from the table shown in FIG. 5. A total of 32 data patterns formed by the PSB, the QSB, the MSB, the CSB, and the LSB may exist.

In operation S111, the code table generator 151 may generate the EMB which is the additional data bit. The code table generator 151 may allocate the EMB, the PSB, and the QSB to the code table of the first memory cell MC1. In addition, the code table generator 151 may allocate the MSB, the CSB, and LSB to the code table of the second memory cell MC2.

At this time, a code pattern formed by the plurality of second data bits may correspond to the preset code pattern. The preset code pattern may mean the invalid pattern.

For example, the invalid code pattern may be included in code patterns corresponding to a sixth data pattern, an eighth data pattern, a fourteenth data pattern, a sixteenth data pattern, a twenty-second data pattern, a twenty-fourth data pattern, a thirtieth data pattern, and a thirty-second data pattern.

Specifically, looking at code patterns 1101 corresponding to the sixth data pattern, the code pattern formed by the MSB, the CSB, and the LSB corresponding to the second memory cell MC2 may be the invalid code pattern. In addition, looking at code patterns 1102 corresponding to the sixteenth data pattern, the code pattern formed by the MSB, the CSB, and the LSB corresponding to the second memory cell MC2 may be the invalid code pattern. Hereinafter, an operation of encoding the code patterns corresponding to the sixth data pattern and the sixteenth data pattern is described for convenience of description, and may be equally applied to other invalid code patterns.

In operation S112, the code table generator 151 may perform an encoding operation of selectively inverting a second data bit among the plurality of second data bits so that the inverted second data bit has the logical value of a first data bit among the one or more first data bits.

For example, looking at the code patterns 1101 corresponding to the sixth data pattern, the code table generator 151 may invert the LSB so that the logical value of the LSB has '0', which is the logical value of the QSB.

As another example, looking at the code patterns 1102 corresponding to the sixteenth data pattern, since the logical value of the QSB and the logical value of the LSB are the same as '1', the code table generator 151 may maintain them as they are.

In addition, the code table generator 151 may selectively invert the additional data bit so that the additional data bit has the first logical value.

For example, looking at the code patterns 1101 corresponding to the sixth data pattern, the code table generator 151 may invert the EMB so that the EMB has '0'. In addition, looking at the code patterns 1102 corresponding to the sixteenth data pattern, the code table generator 151 may invert the EMB so that the EMB has '0'.

In operation S113, the code table generator 151 may selectively invert the first data bit so that the first data bit has the first logical value, and selectively invert a second data bit other than the second data bit so that the second data bit other than the second data bit has the second logical value.

For example, looking at the code patterns 1101 corresponding to the sixth data pattern, the code table generator 151 may invert the MSB other than the LSB so that the MSB has '1'. Since the QSB has the first logical value, the QSB may be maintained as it is without the inversion.

As another example, looking at the code patterns 1102 corresponding to the sixteenth data pattern, the code table generator 151 may invert the QSB so that the QSB has '0'. In addition, the code table generator 151 may invert the MSB other than the LSB so that the MSB has '1'.

Furthermore, the PSB and the CSB may not be inverted and may maintain their values as they are.

As described above, when the additional data bit stored in the first memory cell MC1 has the first logical value, information that the corresponding code patterns are inverted may be indicated.

Accordingly, the code table may include information in which the data pattern of the plurality of data bits is mapped to the combination of the valid code patterns.

Figure 13:
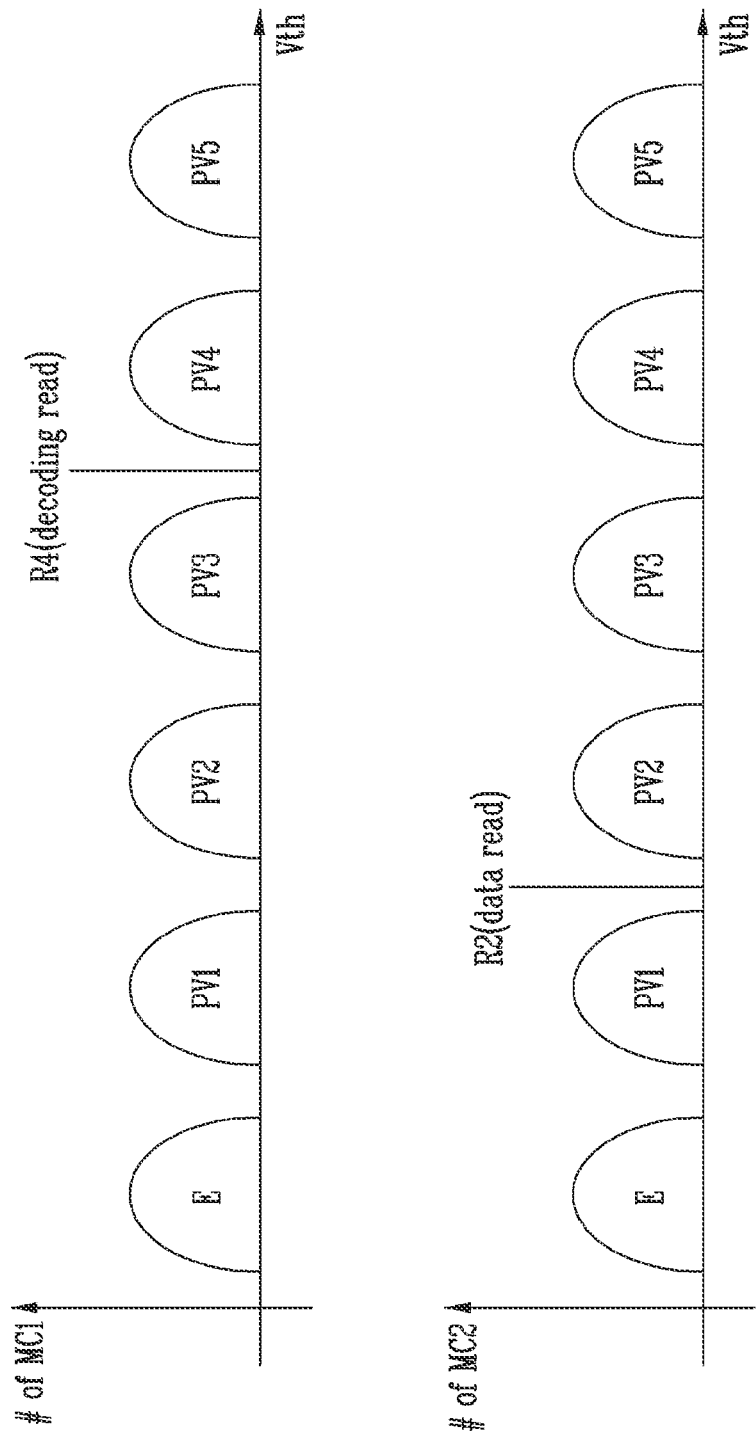
FIG. 13 is a diagram illustrating another example of a read operation according to an embodiment of the present disclosure.

FIG. 12 is a diagram illustrating another example of the number of reads required for a read operation according to an embodiment of the present disclosure. FIG. 13 is a diagram illustrating another example of a read operation according to an embodiment of the present disclosure. Specifically, FIG. 13 may illustrate the read operation of the LSB. In FIG. 13, a horizontal axis represents the threshold voltage of each memory cell, and the vertical axis represents the number of memory cells.

Referring to FIG. 12, the PSB and the CSB which are not encoded may be read from the memory cells through three data read operations (data read).

In a case of the encoded QSB, MSB, and LSB, the decoding read operation (decoding read) may be additionally performed in addition to the data read operation (data read).

In a case of the QSB, since it is required to determine, through the EMB, whether the QSB is inverted through the encoding operation in the previous program operation and it is required to obtain a value stored in the LSB, a maximum of two decoding read operations (decoding read) may be additionally performed. For example, when it is determined, based on the EMB, that the QSB is not inverted through the encoding operation in the previous program operation, the internal operation controller 152 may determine a value of the QSB sensed through the data read operation (data read) as a read value. In contrast, when it is determined, based on the EMB, that the QSB is inverted through the encoding operation in the previous program operation, the internal operation controller 152 may additionally perform the decoding read operation (decoding read) for sensing the logical value stored in the LSB. The internal operation controller 152 may perform the decoding operation of inverting the QSB to have a logical value of the LSB sensed through the decoding read operation (decoding read).

In a case of the MSB and the LSB, one decoding read operation (decoding read) may be additionally performed to determine, through the EMB, whether the MSB and the LSB are inverted through the encoding operation in the previous program operation. For example, when it is determined, based on the EMB, that the LSB is inverted through the encoding operation in the previous program operation, the internal operation controller 152 may perform the decoding operation of inverting the QSB to have a logical value of the LSB and then inverting the LSB so that the LSB has the second logical value. In addition, when it is determined, based on the EMB, that the MSB is inverted, the internal operation controller 152 may selectively invert the MSB so that the MSB has the first logical value.

Referring to FIG. 13, a data read operation (data read) using a second read voltage R2 may be performed to read the LSB. In addition, since the EMB is required to be read from the first memory cells MC1 to determine whether the LSB is inverted through the encoding operation in the previous program operation, one decoding read operation (decoding read) may be performed.

Figure 14:
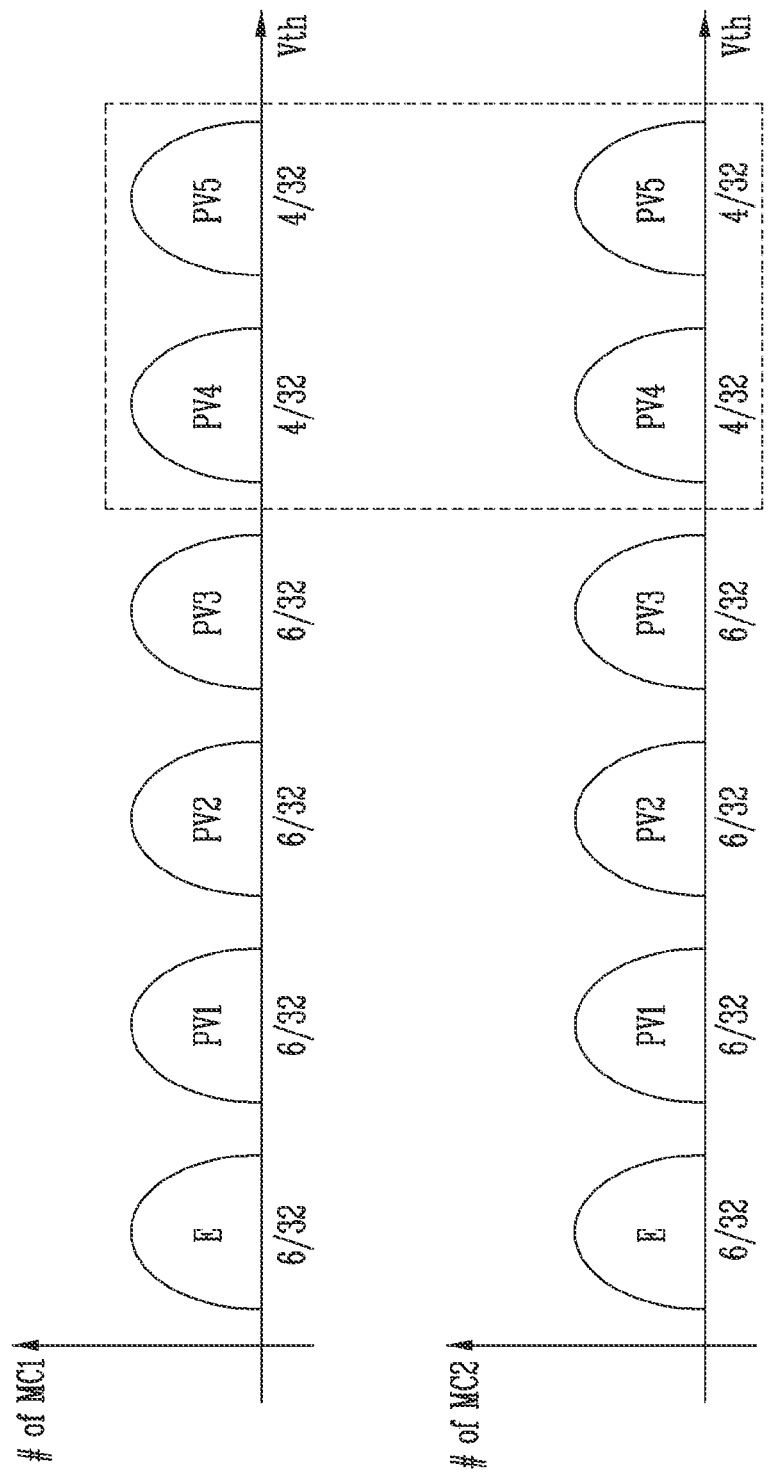
FIG. 14 is a diagram illustrating the number of times a program state is used in a code pattern combination according to an embodiment of the present disclosure.

FIG. 14 is a diagram illustrating the number of times a program state is used in a code pattern combination according to an embodiment of the present disclosure. In FIG. 14, a horizontal axis represents the threshold voltage of each memory cell, and the vertical axis represents the number of memory cells.

Referring to FIG. 14, 32 data patterns formed by five (5) number of data bits may exist. In addition, when the code patterns indicating the states E and PV1 to PV5 of each of the memory cells MC1 and MC2 are combined, 36 code pattern combinations may exist. That is, four code pattern combinations among the code pattern combinations may be combinations which are not mapped to the data patterns.

In an embodiment, the combination which is not mapped to the data patterns may include a code pattern combination between states higher than a preset threshold voltage. For example, the combination which is not mapped to the data patterns may include a code pattern combination between higher states among the plurality of states. In this case, the erase state E and the first to third program states PV1 to PV3 may be used six times in each of the memory cells MC1 and MC2 when combining the code pattern. In contrast, the fourth program state PV4 and the fifth program state PV5 may be used four times in each memory cell when combining the code pattern.

Accordingly, when the number of memory cells included in the higher states is reduced, operation performance of the memory device 100 may be improved, such as reducing a time required for the program operation and improving a cycle of the erase and program operations.

Figure 15:
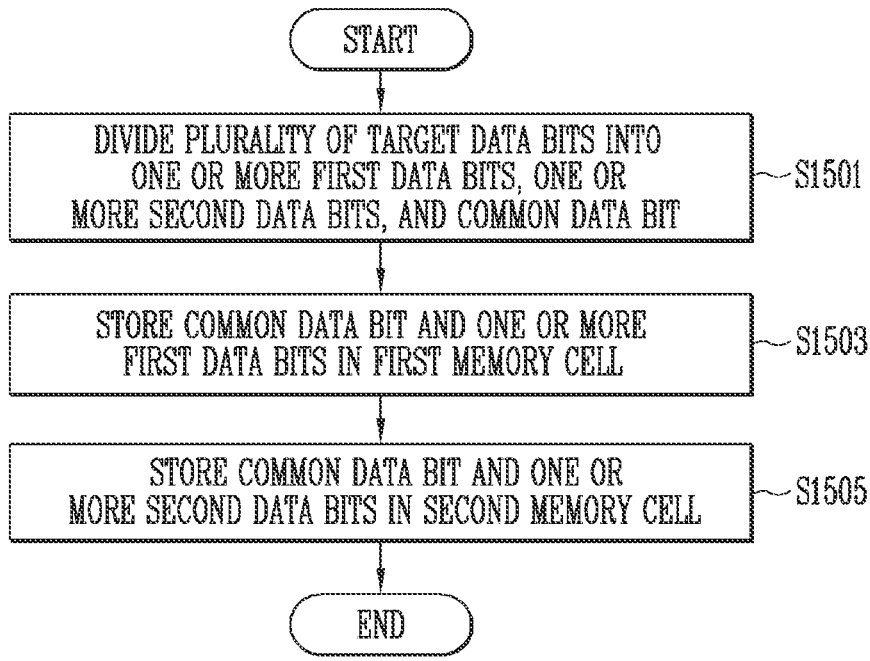
FIG. 15 is a flowchart illustrating an example of a method of operating a memory device according to an embodiment of the present disclosure.

FIG. 15 is a flowchart illustrating an example of a method of operating a memory device according to an embodiment of the present disclosure. The method shown in FIG. 15 may be performed by, for example, the memory device 100 shown in FIG. 1. In addition, FIG. 15 may show an operation of dividing and storing the plurality of target data bits in the plurality of memory cells based on the code table shown in FIG. 4.

In operation S1501, during the program operation, the memory device 100 may divide the plurality of target data bits into the one or more first data bits, the one or more second data bits, and the common data bit.

In operation S1503, the memory device 100 may store the common data bit and the one or more first data bits in the first memory cell.

In operation S1505, the memory device 100 may store the common data bit and the one or more second data bits in the second memory cell.

Figure 16:
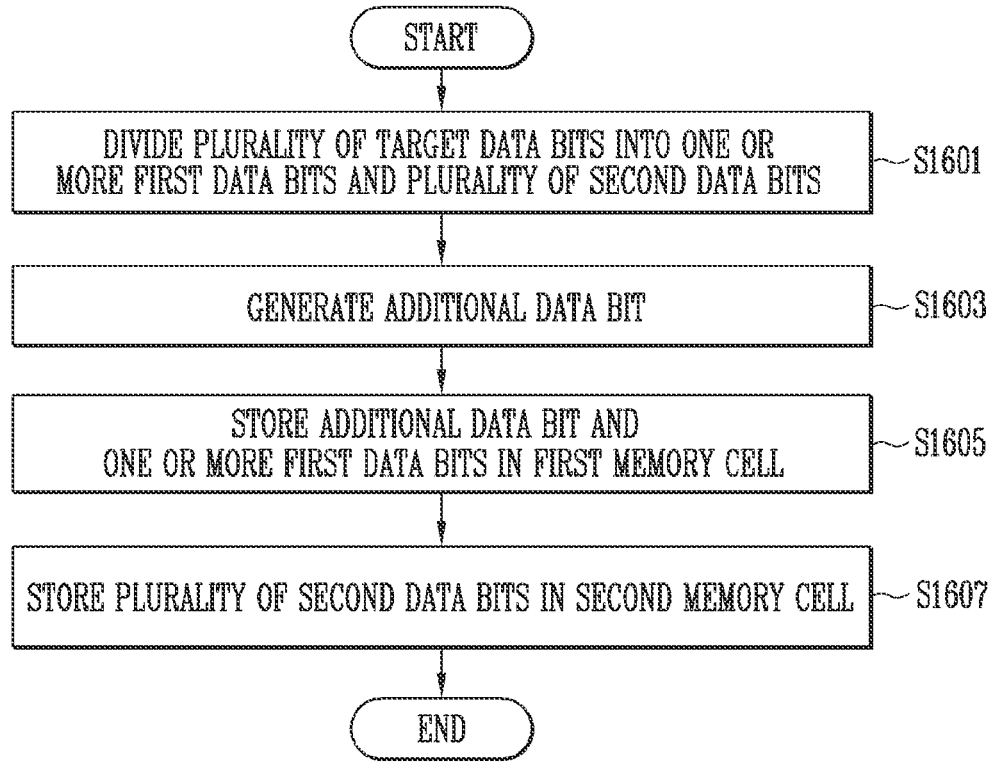
FIG. 16 is a flowchart illustrating another example of a method of operating a memory device according to an embodiment of the present disclosure.

FIG. 16 is a flowchart illustrating another example of a method of operating a memory device according to an embodiment of the present disclosure. The method shown in FIG. 16 may be performed by, for example, the memory device 100 shown in FIG. 1. In addition, FIG. 16 may illustrate an operation of dividing and storing the plurality of target data bits in the plurality of memory cells based on the code table shown in FIG. 10.

In operation S1601, during the program operation, the memory device 100 may divide the plurality of target data bits into the one or more first data bits and the plurality of second data bits.

In operation S1603, the memory device 100 may generate the additional data bit.

In operation S1605, the memory device 100 may store the additional data bit and the one or more first data bits in the first memory cell.

In operation S1607, the memory device 100 may store the plurality of second data bits in the second memory cell.

When implemented in at least partially in software, the controllers, processors, devices, modules, performers, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although various embodiments have been described for illustrative purposes, it will be apparent to those skilled in the art that various changes and modifications may be made without departing from the spirit and scope of the disclosure as defined in the following claims. Furthermore, the embodiments may be combined to form additional embodiments.

What is claimed is:
1. A memory device comprising:
    a plurality of memory cells each configured to have a state among a plurality of states;
    a code table generator configured to generate, based on a plurality of data bits, a code table indicating the plurality of states as code patterns formed by parts of the data bits, the parts corresponding to the respective memory cells; and
    an internal operation controller configured to divide and store a plurality of target data bits in the plurality of memory cells based on the code table during a program operation.
2. The memory device of claim 1, wherein the plurality of memory cells are connected to channels among a plurality of channels formed by separating one channel hole.

3. The memory device of claim 1, wherein a number of the plurality of states is less than a maximum number of code patterns that are formed by one of the parts of the data bits.

4. The memory device of claim 1, wherein the code table is information, through which data patterns formed by the plurality of data bits are selectively mapped to code pattern combinations between the plurality of states.

5. The memory device of claim 4, wherein the data patterns formed by the plurality of data bits are not mapped to, among the code pattern combinations between the plurality of states, a code pattern combination between states higher than a preset threshold voltage.

6. The memory device of claim 5,
wherein the states higher than the preset threshold voltage include a first state and a second state, and
wherein the internal operation controller is further configured to correct, when a first memory cell among the plurality of memory cells is sensed to have the first state during a read operation, a read result so that a second memory cell among the plurality of memory cells is sensed to have a state other than the second state.

7. The memory device of claim 6,
wherein the code table generator generates the code table by:
dividing the plurality of data bits into one or more first data bits, one or more second data bits and a common data bit indicating whether the first data bits and the second data bits are encoded,
allocating the common data bit and the first data bits to the code table of the first memory cell, and
allocating the common data bit and the second data bits to the code table of the second memory cell,
wherein the parts of the data bits are respectively a group of the common data bit and the first data bits and a group of the common data bit and the second data bits.

8. The memory device of claim 6, wherein the code table generator generates the code table by:
dividing the plurality of data bits into one or more first data bits and a plurality of second data bits,
generating an additional data bit indicating whether the first data bits and the plurality of second data bits are encoded,
allocating the additional data bit and the first data bits to the code table of the first memory cell, and
allocating the plurality of second data bits to the code table of the second memory cell,
wherein the parts of the data bits are respectively a group of the additional data bit and the first data bits and a group of the plurality of second data bits.

9. The memory device of claim 1, wherein the internal operation controller divides and stores the plurality of target data bits by encoding, based on the code table, the plurality of target data bits to generate encoded data bits to be stored in each of the plurality of memory cells.

10. The memory device of claim 1, wherein the internal operation controller is further configured to:
read, during a read operation, data bits from the plurality of memory cells, and
obtain read data by decoding the read data bits based on the code table.

11. A method of operating a memory device, the method comprising:
dividing, during a program operation, a plurality of target data bits into one or more first data bits, one or more second data bits, and a common data bit indicating whether the first data bits and the second data bits are encoded;
storing the common data bit and the first data bits in a first memory cell; and
storing the common data bit and the second data bits in a second memory cell.

12. The method of claim 11, further comprising performing, when a code pattern formed by the common data bit and the first data bits or a code pattern formed by the common data bit and the second data bits corresponds to a preset code pattern after the dividing, an encoding operation including:
inverting a first data bit among the one or more first data bits; and
inverting a second data bit among the one or more second data bit.

13. The method of claim 12, wherein the encoding operation further includes inverting any of the common data bits to be stored in the respective first and second memory cells so that the common data bits have different values from each other.

14. The method of claim 13, further comprising performing a re-encoding operation of inverting each of the common data bits to be stored in the respective first and second memory cells when the code pattern formed by the common data bit and the first data bits or the code pattern formed by the common data bit and the second data bits corresponds to the preset code pattern after the encoding operation.

15. The method of claim 13, further comprising:
reading, during a read operation, the common data bit, the first data bits, and the second data bits from the first memory cell and the second memory cell; and
performing a decoding operation of:
inverting, based on the read common data bit, an encoded data bit among the read first data bits and the read second data bits; and
inverting, based on the read common data bit, the read common data bit so that the read common data bit has a first logical value.

* * * * *